(12) United States Patent
Haga et al.

(10) Patent No.: US 7,595,572 B2
(45) Date of Patent: Sep. 29, 2009

(54) MOTOR

(75) Inventors: Hidehiro Haga, Kyoto (JP); Yoshiaki Yamashita, Kyoto (JP); Nakaba Kataoka, Kyoto (JP)

(73) Assignee: Nidec Corporation, Kyoto (JP)

( * ) Notice: Subject to any disclaimer, the term of this patent is extended or adjusted under 35 U.S.C. 154(b) by 267 days.

(21) Appl. No.: 11/758,260

(22) Filed: Jun. 5, 2007

(65) Prior Publication Data

US 2007/0278875 A1    Dec. 6, 2007

(30) Foreign Application Priority Data

Jun. 5, 2006    (JP)    ............................. 2006-156716

(51) Int. Cl.
    *H02K 3/50*    (2006.01)
    *H02K 3/52*    (2006.01)
    *H02K 3/04*    (2006.01)
    *H02K 1/18*    (2006.01)

(52) U.S. Cl. ........................... 310/71; 310/194; 310/218

(58) Field of Classification Search ............... 310/71, 310/180, 194, 216, 218, 260; 439/76.2, 174, 439/189, 213, 675, 874, 890
    See application file for complete search history.

(56) References Cited

U.S. PATENT DOCUMENTS

| | | | | |
|---|---|---|---|---|
| 5,900,687 | A * | 5/1999 | Kondo et al. | 310/71 |
| 5,996,209 | A * | 12/1999 | Molnar et al. | 29/596 |
| 6,674,195 | B2 * | 1/2004 | Yagyu et al. | 310/71 |
| 6,856,055 | B2 * | 2/2005 | Michaels et al. | 310/71 |
| 6,856,057 | B2 * | 2/2005 | Kobayashi et al. | 310/71 |
| 6,870,292 | B2 * | 3/2005 | Owada et al. | 310/194 |
| 6,993,829 | B2 * | 2/2006 | Kobayashi et al. | 29/622 |
| 7,019,433 | B2 * | 3/2006 | Hashimoto et al. | 310/259 |
| 7,026,739 | B2 | 4/2006 | Okada et al. | |
| 7,122,933 | B2 * | 10/2006 | Horst et al. | 310/218 |
| 7,166,949 | B2 | 1/2007 | Okada et al. | |

(Continued)

FOREIGN PATENT DOCUMENTS

JP    2000-014069 A    1/2000

(Continued)

OTHER PUBLICATIONS

Hidehiro Haga et al.; "Motor," U.S. Appl. No. 11/758,264, filed Jun. 5, 2007.

*Primary Examiner*—Tran N Nguyen
(74) *Attorney, Agent, or Firm*—Keating & Bennett, LLP

(57) ABSTRACT

A motor includes a stator including a core back having a circular or substantially circular shape, a plurality of tooth portions extending radially inwardly from the core back, a plurality of insulators covering the tooth portions, a plurality of coils formed by winding wires around the tooth portions via the insulators. The motor also includes a bus bar arranged axially above the stator. The bus bar supports a first conductor plate having a plurality of first terminals to which first end portions of the wires from each phases of the coils are connected. The insulators include a guiding groove and support therein the second conductor plate to which second end portions of the wires are connected. Through the second conductor plate, the second end portions of the wires are connected to the neutral point.

20 Claims, 9 Drawing Sheets

U.S. PATENT DOCUMENTS

| | | |
|---|---|---|
| 7,382,075 B2 * | 6/2008 | Wang et al. .................. 310/194 |
| 2004/0119350 A1 * | 6/2004 | Miya et al. .................... 310/71 |
| 2004/0263015 A1 | 12/2004 | Okada et al. |
| 2005/0253466 A1 * | 11/2005 | Seguchi et al. ................ 310/71 |
| 2006/0119207 A1 | 6/2006 | Okada et al. |

FOREIGN PATENT DOCUMENTS

| | | |
|---|---|---|
| JP | 3498129 B2 | 2/2004 |
| JP | 2005-020875 A | 1/2005 |

* cited by examiner

MOTOR

BACKGROUND OF THE INVENTION

1. Field of the Invention

The present invention generally relates to a motor, in particular to a brushless motor having a stator on which an insulator is arranged.

2. Background of the Related Art

Conventionally, a brushless motor (hereinafter simply referred to as a motor) used for an electric powered power-steering system includes a bus bar having a connector to which a coil arranged on a stator is connected. The stator is centered on a center axis and is formed by axially laminating a plurality of steel plates. The stator includes a core back having a circular shape centered on the center axis and teeth extending radially inwardly from an inner circular surface of the core back. The teeth are arranged in a circumferentially spaced manner from each other. A set of insulators, each of which has a U-shape, are attached to each of the teeth. One of the insulators is attached to each of the teeth from an axially upper side thereof, and the other is attached to the teeth from an axially lower side thereof. Then, a wire is wound around each of the teeth via the insulators such that a coil defined by a multilayer structure of the wire on the teeth is provided on each of the teeth.

Recently, there has been a demand for reducing vibration of the motor used for the powered steering system in order to realize smooth steering. One way to meet the demand is increasing the number of teeth of the stator.

In addition, a number of turns of the wires wound around the teeth may be increased to reduce a space between adjacent teeth (i.e., increase a packing factor of the coils). In order to increase the packing factor and number of teeth, a technique described below has been introduced. Conventionally, a plurality of stator cores, each of which has a tooth, respectively, are separately formed, and a coil is formed on each of the teeth. Then, stator cores are circumferentially attached to each other to provide a stator. Such technique is simply referred to as a divided-core-manufacturing method. In another example, the coils are formed on each of the teeth extending from the core back which has a substantially linear shape, then, the core back is bent at predetermined positions so as to form the circular shape. Such technique is simply referred to as a curving-core-manufacturing method.

In the above-described technique, the wire may be wound around each of the teeth separately, and thus, each of the teeth may include two wire-ends, a winding-starting end and a winding-terminating end. Thus, the bus bar includes twice as many terminals as the number of the teeth.

As number of the terminals arranged on the bus bar increases, space between each terminals is reduced. With a reduced space between adjacent terminals, it becomes difficult to connect the wires to the terminals. In particular, the wire used in the motor for the power steering system generally has a thick dimension. Thus, in the view of workability of connecting wires, it is preferable that the space between adjacent terminals is sufficiently wide.

It is demanded that a component of a vehicle has high reliability under various circumstances for extended periods of time. Thus, it is required that the motor used for the power steering system have that property.

SUMMARY OF THE INVENTION

In order to overcome the problems described above, preferred embodiments of the present invention provide a motor including a stator and a bus bar.

The stator preferably includes a stator core having a core back and a plurality of tooth portions, a plurality of insulators, and a plurality of coils. The core back preferably has a circular or substantially circular shape centered on a center axis, and a plurality of tooth portions extending radially inwardly from the core back and arranged in a circumferentially spaced manner. A plurality of insulators cover at least a portion of the stator core to insulate the portion of the stator core. Each of a plurality of coils is defined by a multilayer structure of a wire wound around each of the tooth portions via the insulator.

The bus bar is arranged axially above the stator and includes a plate support which supports a first conductor plate thereon.

The first conductor plate has a plurality of first terminals to which first end portions of wires extracted from a plurality of coils are to be connected. In addition, a second conductor plate having a plurality of second terminals to which second end portions of wires extracted from a plurality of coils are to be connected is provided to the motor. The second conductor plate is supported by the insulator. The second end portions of the wires are connected to a neutral point via the second terminal plate.

With this unique configuration, the connections to the neutral point are established via the second conductor plate supported by the insulator, and the number of the first terminals of the first conductor plate arranged on the bus bar is reduced, thereby enabling the space between adjacent terminals to be made much greater.

Preferred embodiments of the present invention also provide a motor including a stator and a bus bar. The stator includes a stator core including a plurality of magnetic steel plates laminated in an axial direction and having a core back and a plurality of tooth portions, a plurality of insulators, and a plurality of coils. The core back preferably has a circular or substantially circular shape centered on a center axis, and a plurality of tooth portions extending radially inwardly from the core back and arranged in a circumferentially spaced manner. A plurality of insulators cover at least a portion of the stator core to insulate the portion of the stator core. Each of a plurality of coils is defined by a multilayer structure of a wire wound around each of the tooth portions via the insulator.

The bus bar is arranged axially above the stator and includes a plate support which supports a first conductor plate thereon.

The first conductor plate has a plurality of first terminals to which first end portions of wires extracted from a plurality of coils are to be connected. In addition, a second conductor plate having a plurality of second terminals to which second end portions of wires extracted from a plurality of coils are to be connected is provided to the motor. The second conductor plate is supported by the insulator. The second end portions of the wires are connected to a neutral point via the second terminal plate. The first terminals are arranged at positions different from these the second terminals are arranged at in both of the axial direction and the circumferential direction.

With this unique configuration, the first terminals and the second terminals are not arranged in an axially overlapping manner, which makes it possible to maintain a preferable workability of connecting the end portions of the wire to the first and the second terminals.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
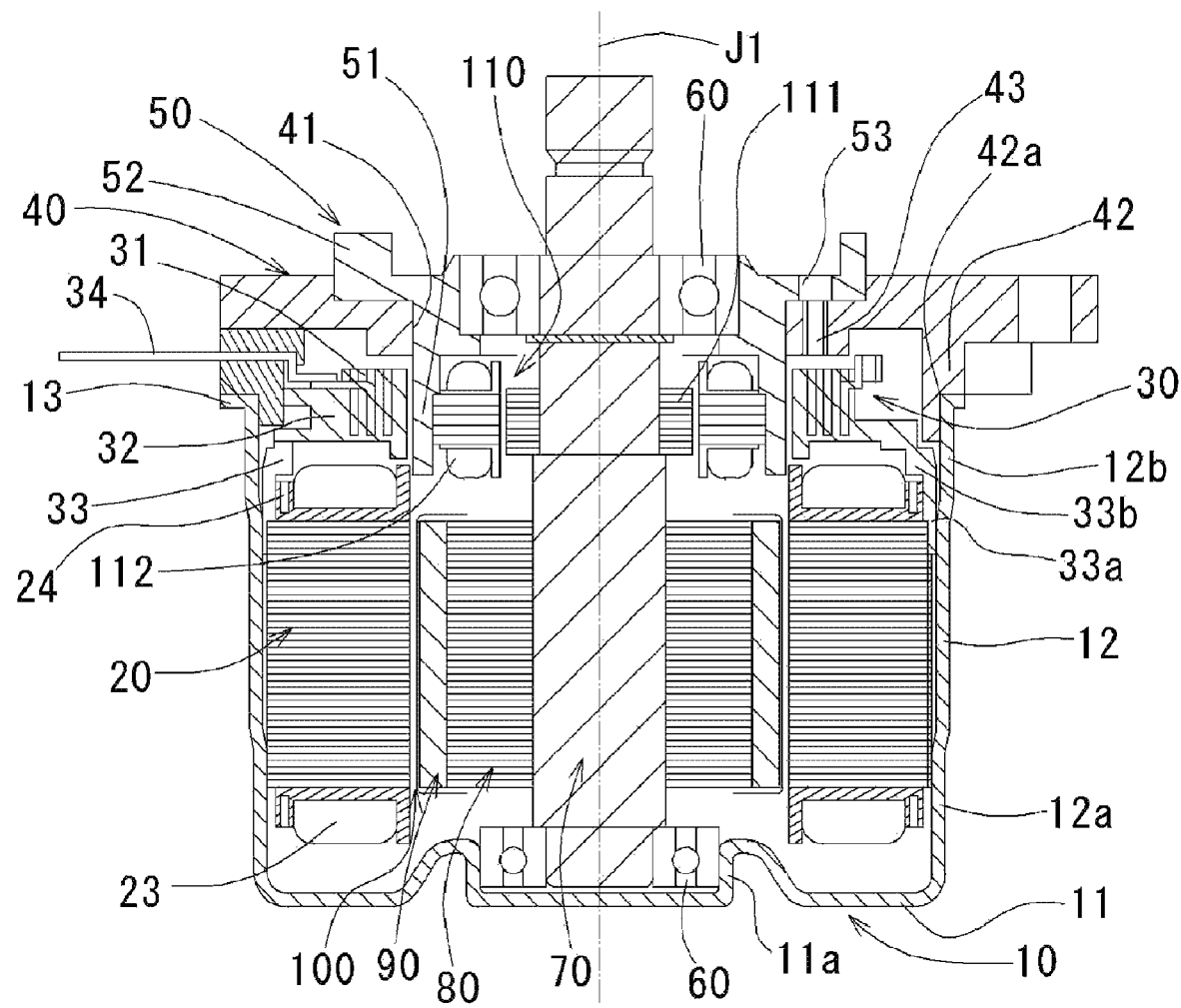
FIG. 1 is a view illustrating a cross section of a brushless motor along a center axis thereof, according to a preferred embodiment of the present invention.

In the following description, when positional relationships among and orientations of the different components are described as being such as top/bottom, up/down or left/right, positional relationships and orientations that are in the drawings are indicated, and positional relationships among and orientations of the components once having been assembled into an actual device are not indicated. Meanwhile, in the following description, an axial direction indicates a direction parallel to a rotation axis, and a radial direction indicates a direction perpendicular to the rotation axis.

General Structure of Motor

With reference to FIG. 1, a structure of a motor according to a preferred embodiment of the present invention will be described. FIG. 1 is a view illustrating a cross section of the motor along a center axis J1.

As illustrated in FIG. 1, a housing 10 of the motor includes a cylindrical portion 12 centered on the center axis J1 and a base 11 closing a lower side of the cylindrical portion 12. The cylindrical portion 12 and the base 11 are, for example, made integral each other by pressing a metallic plate material. The base 11 includes an annular recess 11a at a substantially center portion thereof. The cylindrical portion 12 includes a lower section 12a, an upper section 12b, and a middle section arranged axially between the lower section 12a and the upper section 12b. The lower section 12a has a smaller diameter than that of the middle section, and the upper section 12b has a greater diameter than the middle section. A stator 20 having a circular outside surface is inserted into the housing 10 and an axially lower portion of the stator 20 is press-fitted into the lower section 12a. The housing 10 also includes a flange portion 13 radially outwardly extending from an axially upper end portion of the cylindrical portion 12.

A bus bar 30, which is electrically connected to the stator 20 by connecting wires from the stator 20 thereto, is mounted axially above the stator 20. The bus bar 30 includes a plurality of first conductor plates 31 which is electrically connected with the stator 20, a plate supporting portion 32 which supports the first conductor plates 31, and a plurality of leg portions 33 supporting the bus bar 30 axially above the stator 20. Each of the leg portions 33 has an outer circumferential surface abutted against an inner circumferential surface of the cylindrical portion 12 such that the leg portion 33 is secured to the housing 10.

A bracket 40 which supports various components of the motor (not illustrated in drawings) is arranged axially above the housing 10 and the bus bar 30. In particular, an upper surface of the flange portion 13 and a portion of an inner circumferential surface of the upper section 12b of the cylindrical portion 12b are abutted against the bracket 40 and support the bracket 40 thereon. The bracket 40 includes a substantially discoid portion having an insertion hole 41 centered on the center axis J1. The bracket 40 includes a cylindrical portion 42 axially downwardly extending from the discoid portion and having a diameter that is approximately the same as that of the cylindrical portion 12. An axially lower end of the cylindrical portion 42 includes a step section 42a at which an outer circumferential surface of the cylindrical portion 42 is radially inwardly indented. The step portion 42a is abutted against the upper surface of the flange portion 13 and the inner circumferential surface of the upper section 12b, such that the bracket 40 is supported above the housing 10.

A bearing holder 50 is inserted into the insertion hole 41 and supported by the bracket 40. The bearing holder 50 has a substantially cylindrical shape and includes an inner cylindrical portion 51 and an outer cylindrical portion 52. An outer circumferential surface of the inner cylindrical portion 51 slidably contacts an inner circumferential surface of the bracket 40, defining the insertion hole 41. The outer cylindrical portion 52 contacts an upper surface of the bracket 40. The inner cylindrical portion 51 axially downwardly extends such that an axially lower portion thereof radially faces the bus bar 30.

Ball bearings 60 are arranged on an inner circumferential surface 51 of the bearing holder 50 and in the annular recess 11a, respectively. A shaft 70 is supported by the ball bearings 60 in a rotatable manner with centering on the center axis J1.

A yoke 80 defined by laminating a plurality of magnetic thin plates is attached to a position on the shaft 70 radially inward of the stator 20. A rotor magnet 90 is attached on an outer circumferential surface of the yoke 80 by an adhesive. A cover member 100 made of non-magnetic material is attached at outside of the rotor magnet 90 so as to prevent the rotor magnet 90 from being removed.

A resolver 110, a position detecting mechanism, provided to the motor, is defined by a resolver stator 111 and a resolver stator 112. In general, a resolver is a type of rotary electrical transformer that is used for measuring the angle of a rotating machine. The resolver rotor generally includes a primary winding of the transformer, and is excited by a sinusoidal electric current, which by electromagnetic induction causes currents to flow in resolver coils fixed at right angles relative to each other on the resolver stator. By detecting and processing the signals from the resolver stator, a position of the position of the resolver rotor is detected. The resolver rotor 111 is attached at a position on the shaft 70 radially inward of the bus bar 30, and the resolver stator 112 is attached on the inner circumferential surface of the inner cylindrical portion 51 of the bearing holder 50, wherein the resolver rotor 111 and the resolver stator 112 radially face to each other.

The bracket 40 includes a plurality of bracket-through holes 43, and the bearing holder 50 includes a plurality of bearing-holder-through holes 53. The bearing holder 50 is arranged on the bracket 40 such that the through holes 43, 53 are axially aligned to each other. Fastening elements such as screws (not illustrated in drawings) are inserted and fastened to the through holes 43, 53 and the bracket 40 and the bearing holder 50 are fixed each other. Each of the bracket-holder-through holes 53 preferably has an arc shape centered on the center axis J1, having a radial width substantially the same or greater than the diameter of the fastening means fastened to the bracket-through holes 43, 53. With this configuration, the bearing holder 50 is secured to the bracket 40 in a circumferentially movable manner to a certain degree, enabling adjustment of a circumferential position of the resolver stator 112.

Configuration of Stator, Bus Bar

Figure 2:
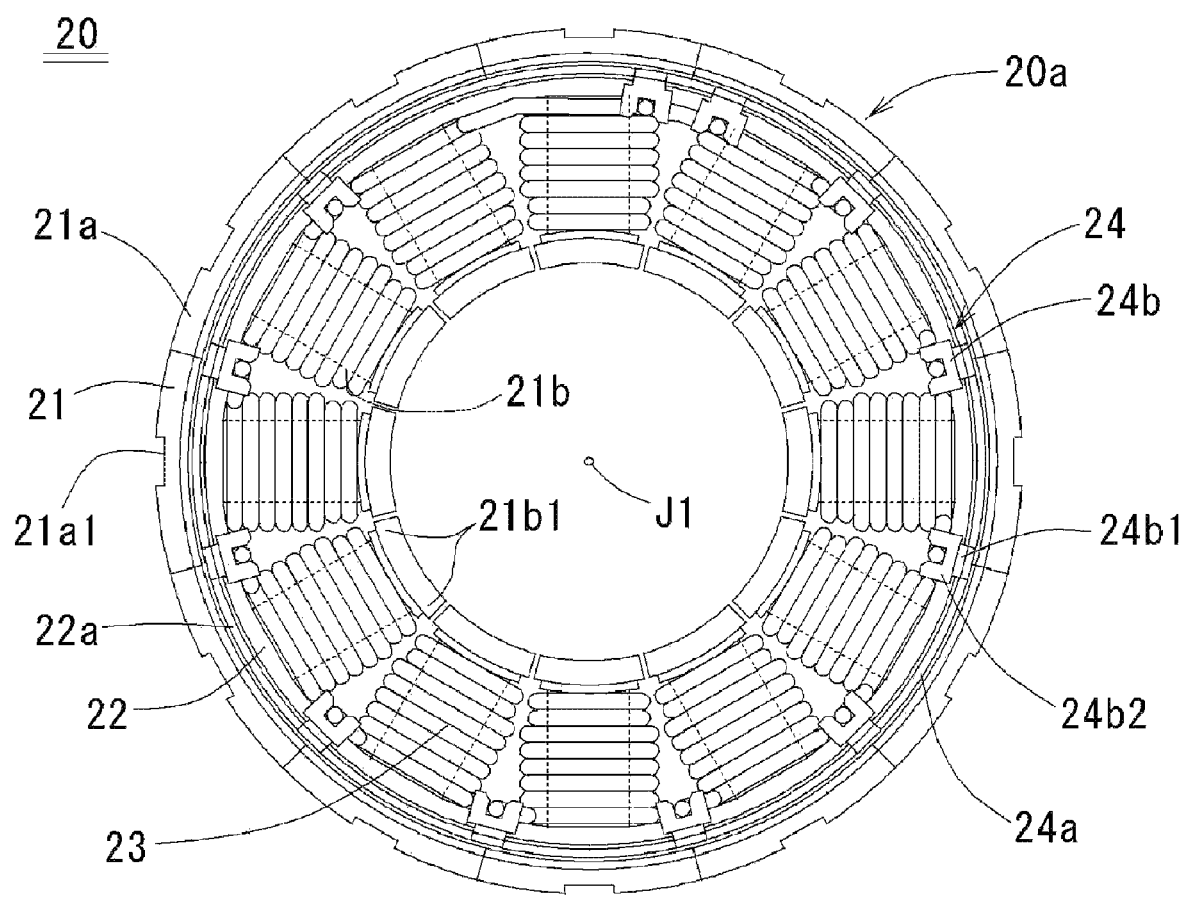
FIG. 2 is a plan view illustrating a stator according to a preferred embodiment of the present invention.
Figure 3:
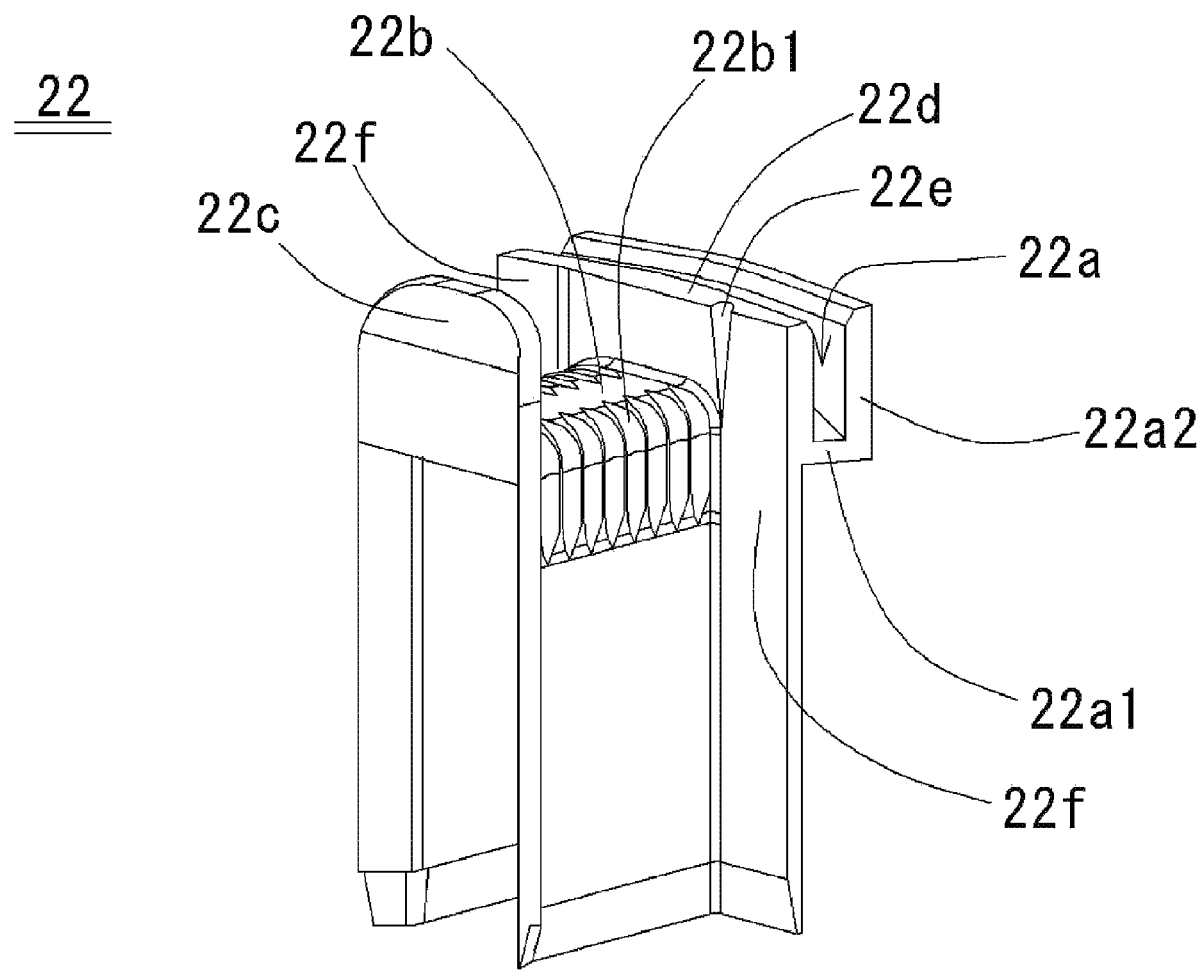
FIG. 3 is a perspective view illustrating an insulator according to a preferred embodiment of the present invention.
Figure 4:
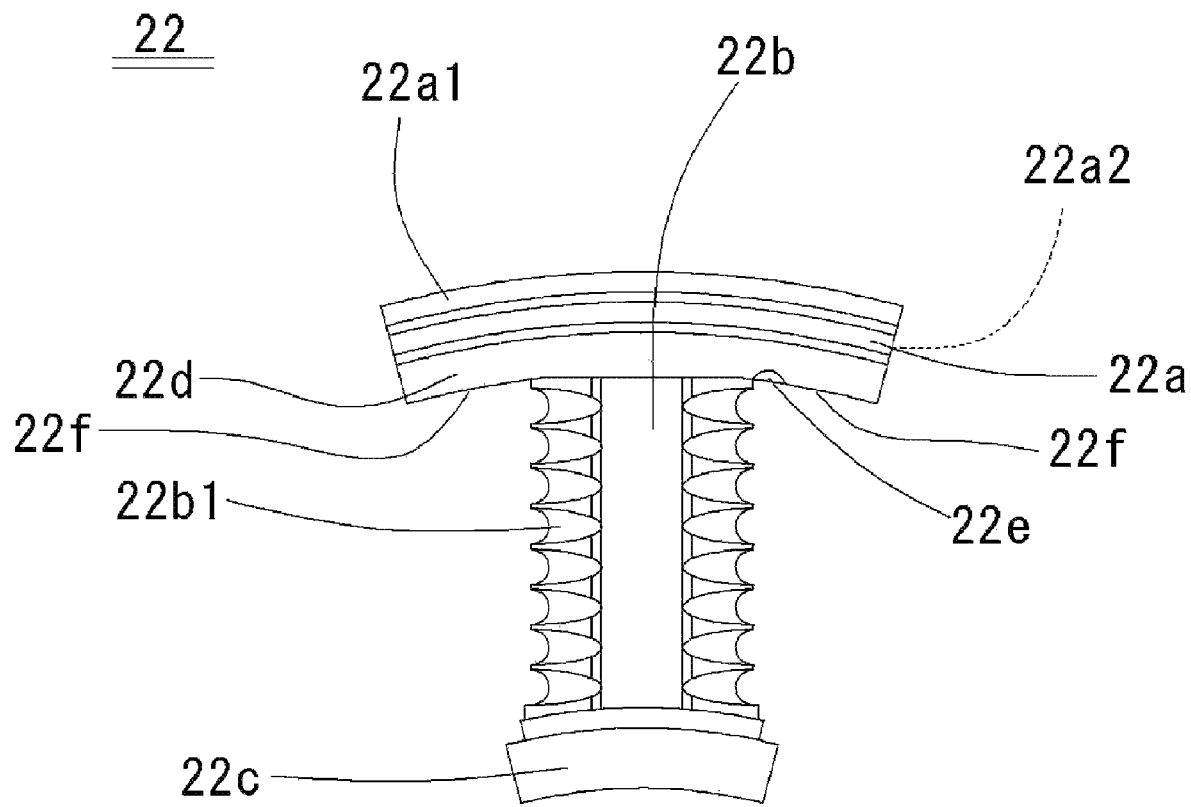
FIG. 4 is a plan view illustrating the insulator.
Figure 5:
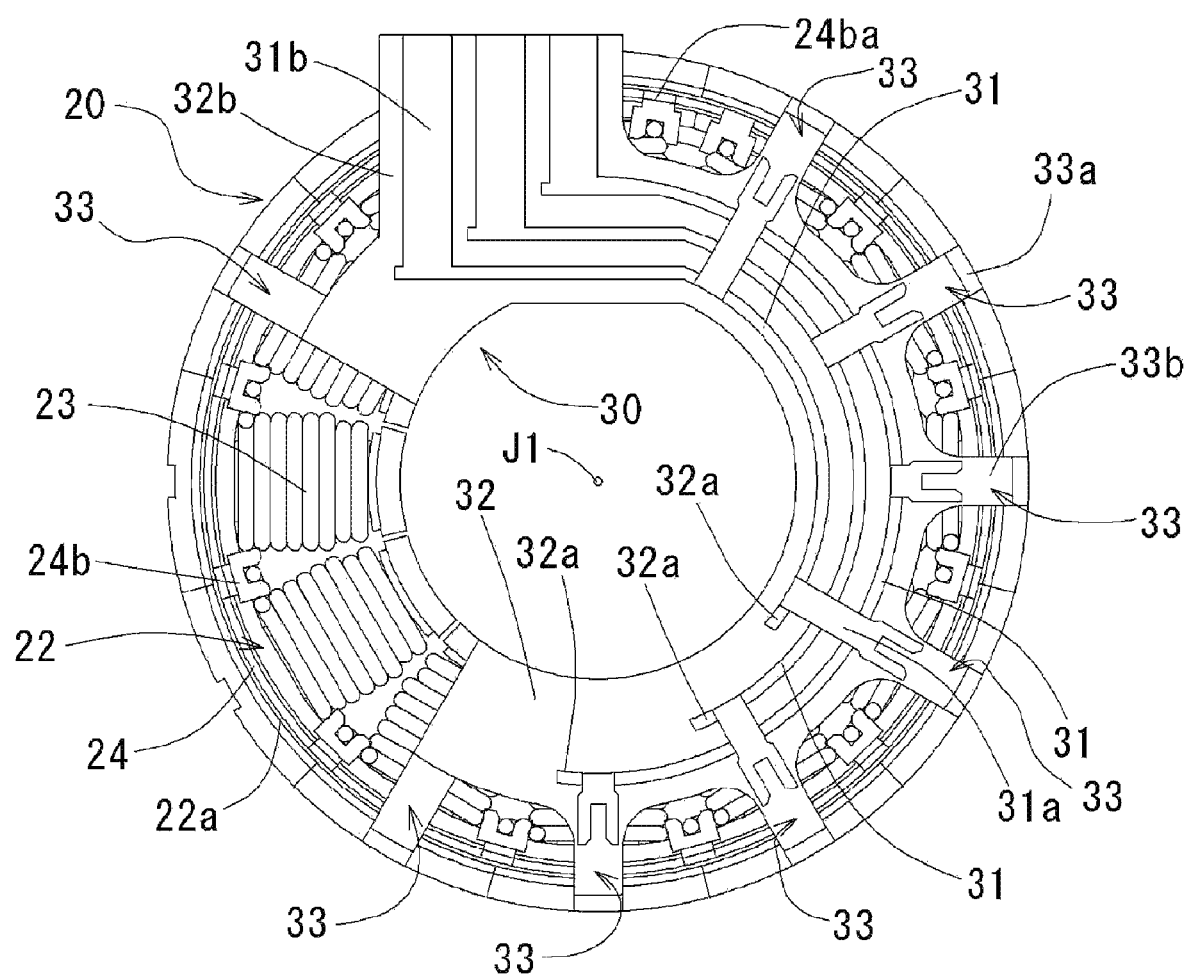
FIG. 5 is a plan view setting forth a positional relationship of the stator and a bus bar when they are assembled together.
Figure 6:
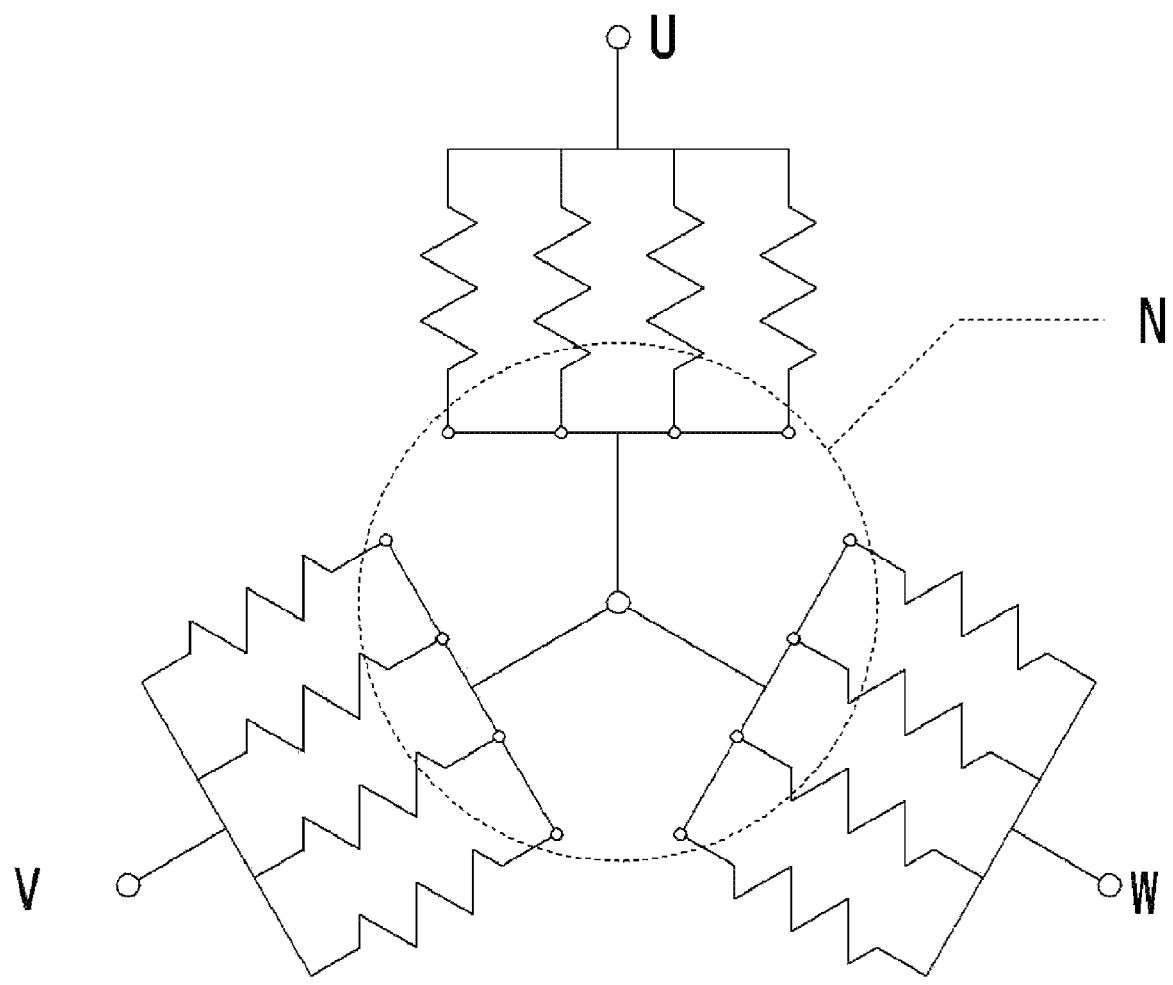
FIG. 6 is a schematic view illustrating electric connections between the stator and the bus bar.
Figure 7:
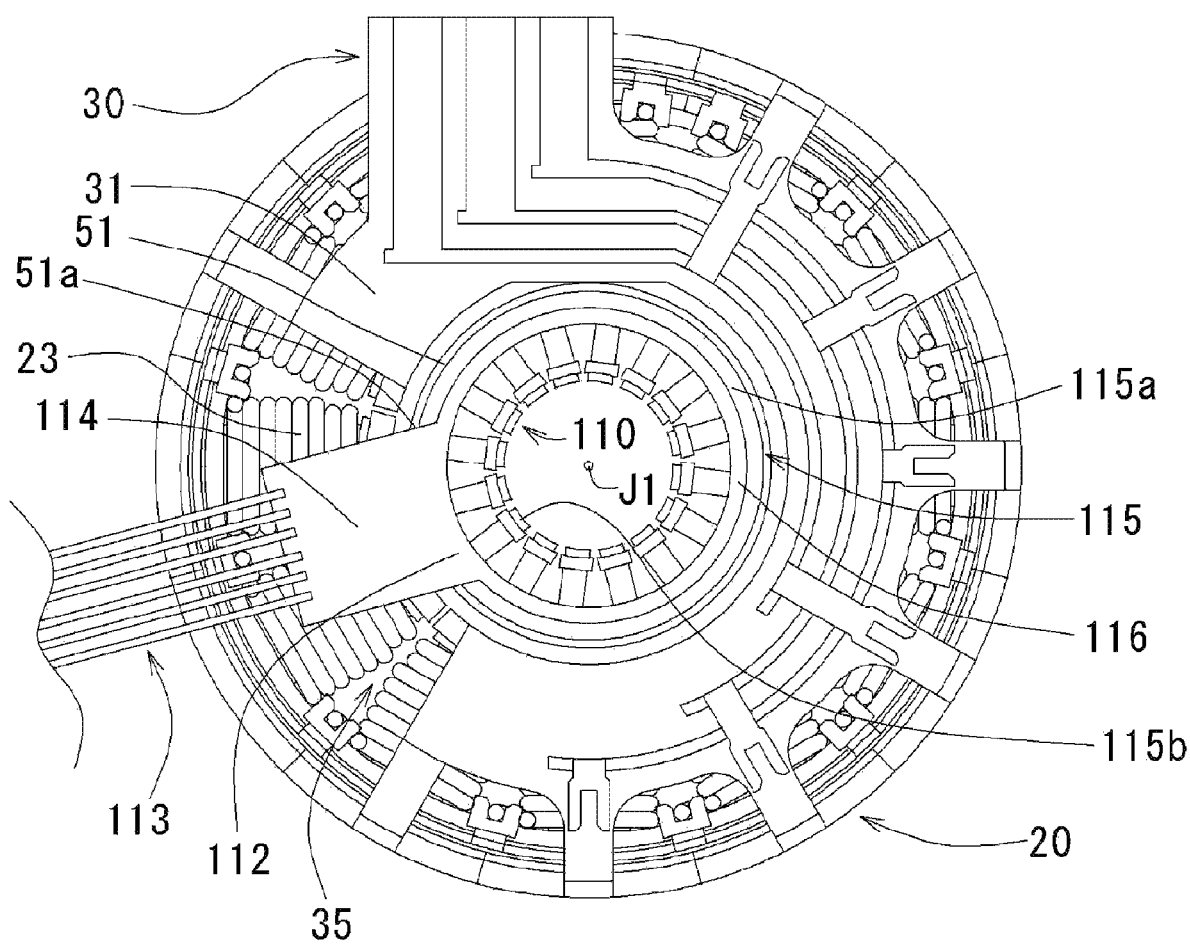
FIG. 7 is a plan view setting forth a positional relationship of a resolver and the bus bar when they are assembled together.
Figure 8:
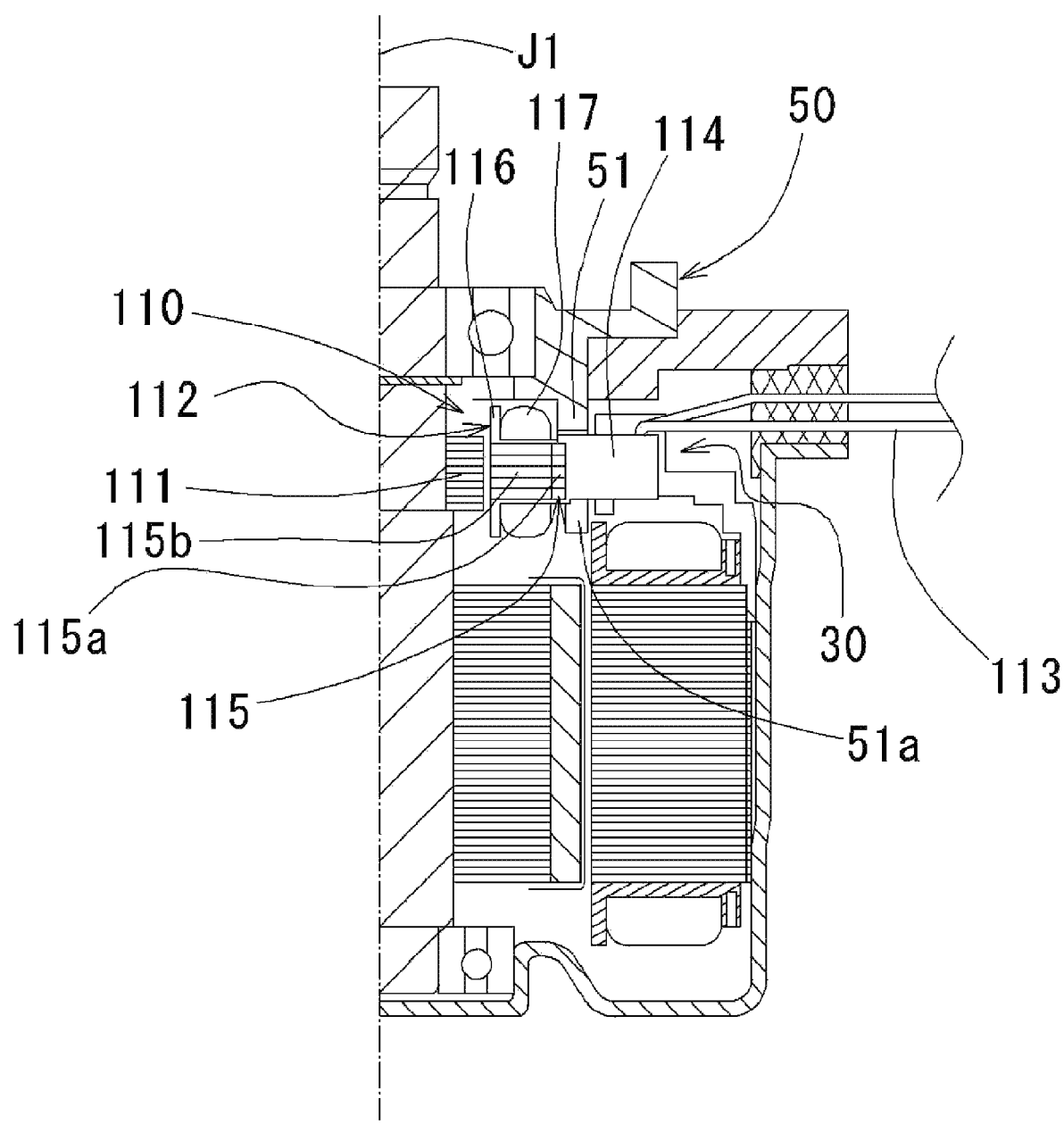
FIG. 8 is a sectional view of the brushless motor along the center axis, setting forth a positional relationship between the resolver and the bus bar.

With reference to FIGS. 2 to 9, the configuration of the stator and the bus bar 30, and a positional relationship between them will be described. FIG. 2 is a top view illustrating the stator 20. FIG. 3 is a perspective view illustrating the insulator. FIG. 4 is a top view illustrating the insulator. FIG. 5 is a top view setting forth a positional relationship between the stator 20 and a bus bar 30 when they are assembled together. FIG. 6 is a schematic view illustrating electric connections of coils 23. FIG. 7 is a top view setting forth a positional relationship of a resolver 110 and the bus bar 30 when they are assembled together. FIG. 8 is a sectional view of the motor setting forth a positional relationship between the resolver 110 and the bus bar 30.

As illustrated in FIG. 2, the stator 20 is formed by combining a plurality of divided cores 20a (for example, twelve divided cores 20a are preferably used in the present preferred embodiment of the present invention). Each of the divided cores 20a includes a stator core 21 defined by a core back portion 21a having an arc shape and a tooth portion 21b extending radially inwardly toward the center axis J1, a set of insulators 22 covering a portion of the stator core 21 (i.e., the tooth portion 21b) from an axially upper side and an axially lower side of the stator core 21, and a coil 23 defined by a multilayer structure of a wire wound around each of the tooth portion 21b via the insulators 22. The insulators 22 are arranged on the stator core 21 to insulate the wire of the coil 23 and the stator core 21.

The stator core 21 is preferably formed by laminating a plurality of thin magnetic steel plates. The stator core 21 further includes a circumferentially extending portion 21b1 extending circumferentially from a radially inner tip of the tooth portion 21b1. The outer circumference surface of the core back portion 21a includes an outer concave portion 21a1 at which a portion of the outer circumferential surface is radially inwardly indented.

As stated above, the insulators 22 attached to the stator core 21 cover a tooth portion 21b and a portion of the radially inner side of the core back portion 21a. More specifically, each of the insulators 22 has a substantially U-shape, and insulators 22 axially cover the tooth portion 21b1 but not an inner circumferential surface of the tooth portion 21b. As illustrated in FIG. 3, at least one of the insulators 22 arranged on an axially upper side of the stator core 21 includes a guiding groove 22a at a radially outside portion thereof, and a second conductor plate 24 preferably having a circular or substantially circular shape is inserted in the guiding groove 22a. The second conductor plate 24 includes a plurality of second terminals 24b (for example, twelve second terminals in the present preferred embodiment of the present invention) arranged thereon.

With reference to FIGS. 3 and 4, a structure of the insulator 22 will be described. As stated above, a set of insulators 22 are arranged on the tooth portion 21b, and one insulator 22 is attached to the tooth portion 21b from the axially upper side thereof, and the other insulator 22 is attached from the axially lower side thereof.

As illustrated in FIGS. 3 and 4, the insulator 22 includes an upper surface 22b covering an upper end of the tooth portion 21b and a side surface covering a side of the tooth portion 21b. The insulator 22 includes a plurality of wire-guiding grooves 22b1 preferably disposed parallel or substantially parallel to each other, each of which extends at least along a portion of the upper surface 22b and the side surface, and has a width that is substantially the same as a diameter of the wire. With the wire-guiding grooves 22b1, the wire is wound around the insulator 22 in a predetermined position. It should be noted, however, that the wire-guiding grooves 22b1 may be extended across the upper surface 22b1 entirely.

The insulator 22 includes an inner wall 22c and an outer wall 22d to prevent the wire wound around the tooth portion 21b via the insulator 22 from falling radially inward and/or radially outward of the tooth portion 21b.

The outer wall 22d includes an outer extending portion 22f, which circumferentially extends from the radially outside end of the side surface. The outer extending portion 22f includes a wire-inlet guide 22e, which is defined by a groove axially extending along the radially outside end of the side surface in a radially inner side of the outer extending portion 22f. When the wire is wound around the insulator 22, the wire is positioned in the wire-inlet guide 22e and then winding of the wire is performed. A depth and a width of the groove defining the wire-inlet guide 22e gradually increase along the axial upper direction. In other words, the wire-inlet guide 22e extends in the axial direction while inclining in the radially outside direction.

In general, when the wire is wound around the tooth portion 21b to form the coil 23 (not illustrated in drawings) thereon, the wire is bent and hocked at an axial upper end of the outer wall 22d (i.e., at an upper end portion of the wire-inlet guide 22e), and the wire is pulled axially downwardly and wound around the tooth portion 21b with maintaining a substantially constant tension applied thereto. With the wire-inlet guide 22e, the wire is easily positioned at the beginning of winding wire process, facilitating the guiding of the wire to the wire-guiding groove 22b1 (i.e., facilitating the wire-winding process). In the present preferred embodiment of the present invention, since the wire-inlet guide 22e axially extends while inclining in the radially outside direction, the force applied to a portion of the wire at which the wire is bent may be reduced at the beginning of the wire-winding process. Thus, it is possible to prevent the wires from being damaged by contacting the outer wall 22d of the insulator 22.

The insulator 22 includes the guiding groove 22a. The guiding groove 22a is defined by an radially outer surface of the outer extending portion 22f, an outer extension 22a1 radially outwardly extending from the radially outer surface of the outer extending portion 22f, and a groove wall 22a2 axially upwardly extending from an radially outside end of the outer extension 22a1. As illustrated in FIG. 3, the outer extending portion 22f extends into the axial direction and covers a radially inside surface of the core back portion 21a.

The outer wall 22d has an arc shape in its axially top view (see FIG. 4), and a length in a circumferential direction is determined by an arc angle thereof. The approximate arc angle of the outer wall 22d is obtained by dividing 360 degrees by the number of tooth portions 21b to be arranged in the stator 20. In the present preferred embodiment of the present invention, twelve tooth portions 21b are arranged in the stator 20, thus, the arc angle of the outer wall 22d is approximately 30 degrees. Meanwhile, lengths of the outer wall 22d, the outer extension 22a1, and the groove wall 22a2, in the circumferential direction centered on the center axis J1 are preferably slightly smaller than the circumferential length determined by the arc angle. With this configuration, the insulators 22 of the divided cores 20a arranged adjacent in the circumferential direction do not contact to each other when the stator 20 is assembled by arranging the divided cores 20a in the circular configuration, thereby maintaining a preferable roundness of the inner surface of the stator 20.

With reference to FIG. 2, a configuration of the second conductor plate 24 arranged in the guiding groove 22a will be described.

The second conductor plate 24 includes a body portion 24a having a cylindrical shape and a plurality of second terminals 24b radially inwardly protruding from the body portion 24a. One end portion of the wire wound around the tooth portion 21b is electrically connected to the second terminals 24b, respectively. Hereinafter, one end of the wire is referred to as a winding-starting end firstly held with the wire-inlet guide 22e and connected to the corresponding terminal 24b when the wire is wound around the tooth portion 21b.

The body portion 24a is preferably formed by pressing a conductive metallic plate into a predetermined shape and rounding a pressed conductive metallic plate into a cylindrical or substantially cylindrical shape. Then, the second terminals 24b are formed by bending portions of the body portion 24a in the radially inward direction.

Each of the second terminals 24b includes a bent portion 24b1 radially inwardly extending from the body portion 24a and a connecting portion 24b2 axially upwardly extending from a radially inner end of the bent portion 24b1. The bent portion 24b1 and the connecting portion 24b2 are preferably integral, and the winding-starting end of the wire is electrically connected to the connecting portion 24b2 by welding, for example.

With reference to FIGS. 1 and 5, a configuration of the stator 20 and the bus bar 30 will be described.

The bus bar 30 includes a plurality of leg portions 33 arranged in the circumferentially spaced manner. As previously described, each of the leg portions 33 includes the first step section 33a which is abutted against the upper surface of the stator core 20 at and/or around outer concave portion 22a1. At an axially upside portion of the first step section 33a, the second step section 33b is arranged. The second step section 33b radially inwardly extends so as to cover the axially upside of the guiding groove 22a. The upper section of the second step section 33b extends in the radially inward direction and is connected to the plate support 32. The plate support 32 supporting a plurality of first conductor plates 31 is arranged axially above the coils 23 of the stator 20.

As illustrated in FIG. 5, the plate support 32 is formed in an approximately C-shape (i.e., arc shape) centered on the center axis J1. The plate support 32 includes a plurality of insertion grooves 32a (for example, three grooves in the present preferred embodiment of the present invention) formed in an axially upper portion thereof and juxtaposed to each other in the radial direction. The first conductor plate 32a, having the first terminals 31a to which the winding-terminating ends from the coils 23 are connected, is arranged in the insertion groove 32a. The first terminals 31a extend to radially outside of the plate support 32 and are arranged axially above the leg portions 33. The first conductor plates 31 extend along the insertion grooves 32a, and are electrically connected to the external power supply (not illustrated in drawings) via the external connector 34 (see FIG. 1). The external connector 34 is preferably welded to the first conductor plate 31 at the connecting portion 32b.

The second terminals 24b of the second conductor plate 24 arranged in the guiding groove 22a are preferably circumferentially equally spaced manner but for a location near an output terminal 31b used for connecting the bus bar 30 and the second conductor plate 24. Near the output terminal 31b, the second terminal 24ba is arranged adjacent to the output terminal 31b in the circumferential direction. In relation to the bus bar 30, the terminals 24 are arranged between adjacent leg portions 33 in the circumferential direction respectively. Meanwhile, the first conductor plate 31 of the bus bar 30 includes first terminals 31a to be arranged axially above the leg portions 33 (i.e., the leg portions 33 and the first terminals 31a are arranged in an axially overlapping manner). With this configuration, the second terminals 24b are arranged circumferentially between the adjacent leg portions 33 and the adjacent first terminals 31a, ensuring accessibility to the second terminals 24b. Thus, in the present preferred embodiment of the present invention, a process of connecting wire-ends of the wires defining the coils 33 to the second terminals 24b is facilitated.

In addition, in the present preferred embodiment of the present invention, since a second step section 33b (see FIG. 1) of the leg portions 33a is arranged axially above the guiding groove 22a of the insulator 22, it is possible to prevent the second conductor plate 24 from being removed in the axial direction. Meanwhile, a radially outside tip of the first terminal pin 31a is arranged radially outward from a radially inner tip of the second terminal 24b.

As illustrated in FIGS. 2 and 5, the stator 20 preferably includes, for example, twelve divided cores 20a and twelve coils 23 formed on each of tooth portions 21b of each of the divided cores 20a. Since each of the coils 23 includes two wire ends, the winding-starting end and a winding-terminating end, twenty-four terminals, to which corresponding coils 23 are connected, are provided to the bus bar 30 according to the preferred embodiment of the present invention. As illustrated in FIG. 6, the motor according to the present preferred embodiment of the present invention is a three-phase motor (including U, V, and W phases) having a star configuration in which U, V and W phases are connected at a neutral point N.

As illustrated in FIG. 6, the winding-starting end of the wire defining each of coils 23 is connected to the neutral point N, thus twelve terminals, four terminals for each U, V, and W phases, are arranged on the motor. The connections to the neutral point N are achieved by the connecting winding-starting ends to the second terminals 24b arranged on the second conductor plate 24. Meanwhile, the winding-terminating end of the wires defining coils 23 are connected the first terminals 31a arranged on the bus bar 30. By achieving connections to the neutral point N by the second conductor plate 22a arranged in the guiding groove 22a of the insulator 22, the number of connections to the bus bar is reduced, resulting in a reduction in the size of the bus bar 30 by reducing the terminals arranged on the bus bar 30.

By reducing number of connections to the bus bar 30, the number of the first terminals 31a arranged on the bus bar 30 is reduced as well, and thus, a width provided between adjacent first terminals 31a is increased, ensuring accessibility to the first terminals 31a and facilitating wiring of the wire-terminating ends. Making the width between two adjacent first terminals 31a greater, it enables to connect a plurality of winding terminal ends (two winding-terminal ends in the present preferred embodiment of the present invention) from the same phase to one first terminal 31a. Through the configuration, number of first terminals 31a arranged on the bus bar 30 will be further reduced, making the width between adjacent first terminals 31a further greater.

With reference to FIGS. 1, 7, and 8, a positional relationship between the bus bar 30 and the resolver 110 will be described. In FIG. 12, the resolver rotor 110 and coils of the resolver stator 112 are not illustrated.

As illustrated in FIG. 1, the resolver 110 is arranged radially inward of the plate support 21 of the bus bar 30. Through the configuration, it is possible to reduce the axial height of the motor.

As illustrated in FIG. 7, the resolver 110 includes a resolver stator 112 and the resolver rotor 111, and the resolver stator 112 includes a connecting portion 114 to which a lead wire 113 is connected. The resolver stator 112 is connected to an external controller (not illustrated in drawings) via the lead wire 113 to send a signal to the external controller. The lead wire 113 is connected to the connecting portion 114 from an axially upper side of the connecting portion 114. With this configuration, it is possible to prevent the lead wire 113 from contacting with the coils 23 of the stator 20.

As illustrated in FIG. 8, the inner cylindrical portion 51 of the bearing holder 50 includes a notch 51a through which the connecting portion 114 extends in the radially outside of the inner cylindrical portion 51.

As illustrated in FIGS. 7 and 8, the resolver stator 112 of the resolver 110 includes a resolver stator core 115 having a circular or substantially circular resolver core back 115a and a plurality of resolver teeth 115b radially inwardly extending from the resolver core back 115a, resolver insulators 116, and a plurality of resolver coils 117 defined by wires wound around the resolver teeth 115b via the resolver insulators 116. The resolver stator core 115 is preferably formed by laminating a plurality of magnetic plates. The resolver rotor 111 is also preferably formed by laminating a plurality of magnetic plates.

As illustrated in FIG. 7, the bus bar 30 preferably has a substantially C-shaped configuration (i.e., arc shape), and the connecting portion 114 of the resolver 110 and the lead wire 113 are arranged in an open space 35 of the arc shape, such that the bus bar 30, the connecting portion 114, and the lead wire 113 are not arranged in an axially overlapping manner. With this configuration, it is possible to prevent the connecting portion 114 and the bus bar 30 from contacting each other even when the resolver 110 and the bus bar 30 are arranged in a radially overlapping manner.

Method of Manufacturing Assembly of Stator and Bus Bar

Figure 9:
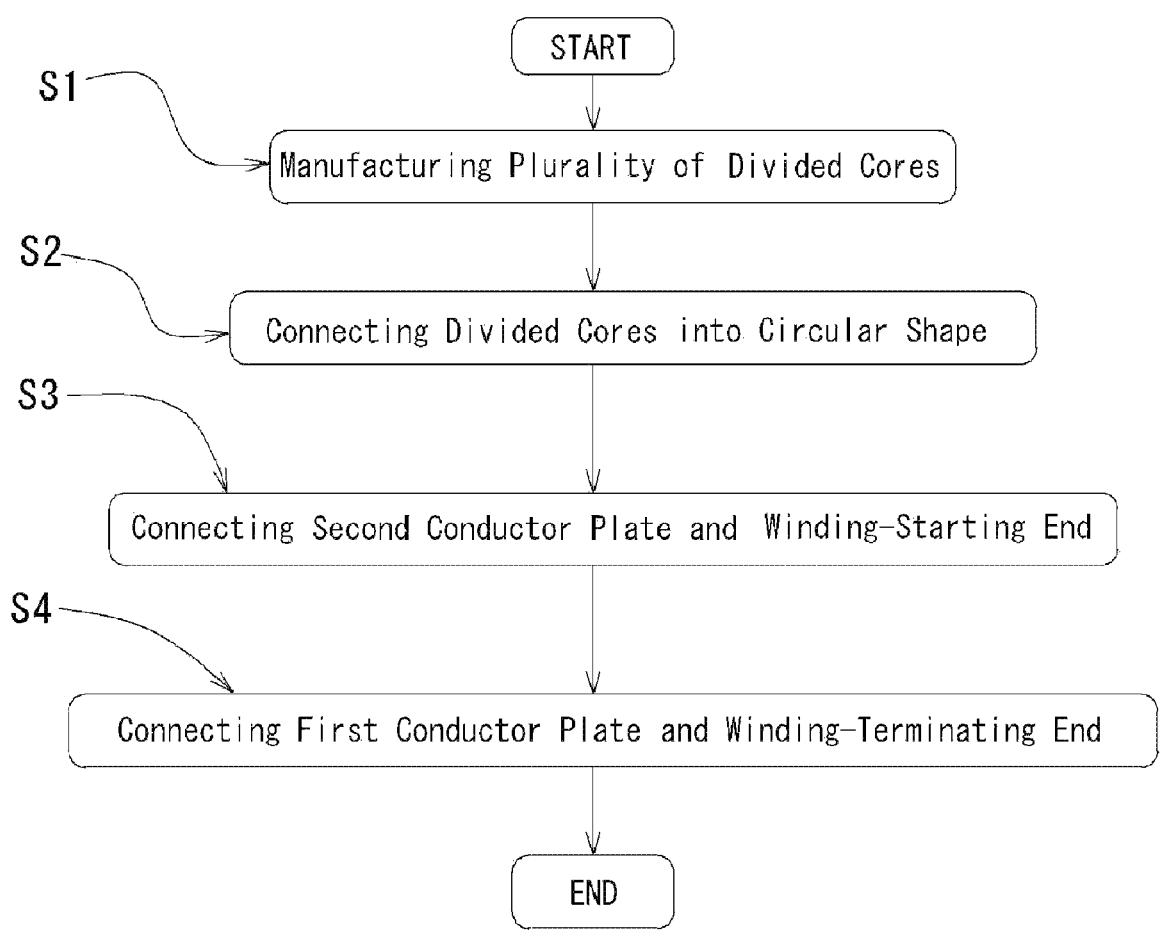
FIG. 9 is a chart setting forth a process flow in assembling the stator and the bus bar.

Next, with reference to FIG. 9, a method of manufacturing an assembly of the stator 20 and the bus bar 30 will be described. FIG. 9 is a flow chart illustrating the steps of a process for assembling the stator 20 and the bus bar 30.

Firstly, a plurality of divided cores 20a are manufactured (a step S1). In manufacturing each of the divided cores 20a, a plurality thin magnetic steel plates are laminated and a laminated body is provided. Then, a set of insulators 22 are attached to each of the divided cores 20a from axially upper and lower sides of the laminated body. Next, the winding-start end of the wire is secured in the wire-inlet guide 22e of one of the insulators 22, and the wire is wound around a portion of the laminated body corresponding to the tooth portion 21b via the insulators 22 to form a coil 23. Through this process, the divided cores 20a are provided.

Secondly, a plurality of divided cores 20a are connected in a circular or substantially circular configuration to form the stator core 20 having a circular or substantially circular shape (a step S2). In the present preferred embodiment of the present invention, for example, twelve divided cores 20a are preferably used to construct the stator core 20. The divided cores 20a are connected to each other by welding a connecting portion arranged on an outer surface of each divided core 20a.

Thirdly, the second conductor plate 24 is inserted into the guiding groove 22a of the insulator 22, and the winding-starting ends of the wires and the second conductor plate 24 are connected (a step S3). In the present preferred embodiment of the present invention, the second terminals 24b, except the one arranged adjacent to the output terminal 31b, are axially aligned with the wire-inlet guides 22e, thereby facilitating the connecting process in which the winding-starting ends and the second terminals 24b are connected.

Finally, the leg portions 33 of the bus bar 30 are abutted against the outer rim of the core back 21a of the stator core 21, and the winding-terminating ends of the wires are connected to the first terminals 31a arranged on the first conductor plate 31 of the bus bar 30 (a Step S4).

While preferred embodiments of the present invention have been described above, it is to be understood that variations and modifications will be apparent to those skilled in the art without departing the scope and spirit of the present invention.

In the preferred embodiments of the present invention, the bus bar 30 is preferably formed by inserting the first conductor plate 31 into the insertion groove 32a of the plate support 32. Alternatively, the bus bar 30 having the first conductor plate 31 and the plate support 32 may be formed by injection molding.

In preferred embodiments of the present invention, the stator 20 preferably includes a plurality of divided cores 21 connected to each other so as to define a circular or substantially circular shape. Alternatively, the stator 20 may be constituted with a single stator core having a circular or substantially circular shape. Alternatively, the stator 20 may be formed by curving the stator core, having a straight shape and a plurality of coils, at the predetermined positions to form the stator core into the circular or substantially circular shape.

In preferred embodiments of the present invention, the second conductor plate 24 preferably a circular or substantially circular shape. Alternatively, the second conductor plate 24 may have any suitable shape as long as the connections between the wire ends and the second terminals 24b can be established. For example, the second conductor plate 24 may have an arc shape or a polygon shape (e.g., dodecagon).

In preferred embodiments of the present invention, for example, twelve divided cores 20a are preferably connected to form the stator 20. However, the number of divided cores to be used for forming the stator 20 is not limited to twelve. Alternatively, the stator 20 may includes one stator core having a circular or substantially circular shape. In the present preferred embodiment of the present invention, the wire is preferably wound around each of the tooth portions 21b of each of the divided cores 21a. It should be noted, however, other wire-winding methods (e.g., a distributed winding method) may be preferably applied.

In preferred embodiments of the present invention, the second terminals 24b are arranged radially inward of the body portion 24a of the second conductor plate 24 preferably by providing the bent portions 24b1 radially inside of the body portion 24a. It should be noted that the second terminals 24b may be arranged radially outside of the body portion 24a of the second conductor plate 24 by providing the bent portions 24b1 radially outside of the body portion 24a as long as the second terminals 24b do not interfere with other components. Meanwhile, it is not necessary to provide the bent portion 24b1 to the second terminals 24.

The motor according to preferred embodiments of the present invention preferably has a star configuration. Alternatively, the motor may have a delta configuration. In this case, three second conductor plates are preferably arranged on the motor, and it is preferable that each of the second conductor plates has an arc shape.

In the preferred embodiments of the present invention, the stator 20 preferably has a plurality of divided cores 21 connected into a circular or substantially circular shape. Alternatively, the stator 20 may be formed by curving the stator core, having a straight shape and a plurality of coils, at the predetermined positions to form the stator core into the circular or substantially circular shape.

What is clamed is:

1. A motor comprising:
    a stator including:
        a stator core including a core back having a substantially circular shape centered on a center axis, and a plurality of tooth portions extending radially inwardly from the core back and arranged in a circumferentially spaced manner;
        a plurality of insulators covering at least a portion of the stator core so as to insulate at least the portion of the stator core; and
        a plurality of coils each of which is defined by a multilayer structure of a wire wound around each of the tooth portions via the insulator;
    a bus bar arranged axially above the stator and including a plate support;
    a first conductor plate supported by the plate support and having a plurality of first terminals to which first end portions of wires extracted from the plurality of coils are to be connected; and
    a second conductor plate supported by the insulator and having a plurality of second terminals to which second end portions of the wires are to be connected; wherein
    the second end portions of the wires are connected to a neutral point via the second conductor plate.

2. The motor as set forth in claim 1, wherein each of the insulators includes an inner wall arranged at a position corresponding to a radially inner end of a corresponding tooth portion and an outer wall arranged at a position corresponding to a radially outer end of the corresponding tooth portion, each of the coils is arranged radially between the inner wall and the outer wall, and a guiding groove in which the second conductor plate is supported is arranged radially outside of the outer wall.

3. The motor as set forth in claim 2, wherein a radially inner side of the guiding groove is defined by a portion of the outer wall.

4. The motor as set forth in claim 2, wherein the guiding groove has a substantially circular configuration extending in a circumferential direction centered on the center axis.

5. The motor as set forth in claim 1, wherein the motor is a three-phase motor having a star configuration in which U, V and W phases are connected at the neutral point.

6. The motor as set forth in claim 5, wherein the plurality of second terminals are integral with a body portion of the second conductor plate.

7. The motor as set forth in claim 1, wherein the second conductor plate has a body portion circumferentially extending and connecting the plurality of second terminals to each other, the bus bar includes a leg portion having an axially lower portion abutted against the stator to support the bus bar axially above the stator, and a portion of the bus bar is arranged axially above the body portion of the second conductor plate such that a movement of the second conductor plate in the axial direction is restricted.

8. The motor as set forth in claim 1, wherein the second conductor plate is supported by axially upper portions of the insulators, the plurality of second terminals extend in a radially inner direction, and the plurality second terminals are arranged to be circumferentially spaced from the leg portion.

9. The motor as set forth in claim 8, wherein the first terminals are arranged in a circumferentially spaced manner from each other, the second terminals are arranged in a circumferentially spaced manner from each other, and each of the first terminals is arranged circumferentially between adjacent second terminals.

10. The motor as set forth in claim 8, wherein the second terminals are arranged radially outside of the plate support of the bus bar.

11. The motor as set forth in claim 1, wherein the first terminals are arranged in a circumferentially spaced manner from each other, the second terminals are arranged in a circumferentially spaced manner from each other, and each of the first terminals is arranged circumferentially between adjacent second terminals.

12. The motor as set forth in claim 1, wherein each of coils arranged on each of the tooth portions includes a first end portion and a second end portion of each of the wires wound around each of the tooth portions, the first portion is connected to a corresponding first terminal, and the second end portion is connected to a corresponding second terminal.

13. The motor as set forth in claim 1, wherein the stator includes a plurality of divided cores each of which has a single tooth portion and a single coil defined by the multilayer structure of the wire wound around the tooth portion via the insulator, and the stator is defined by the plurality of divided cores connected to each other in a substantially circular configuration.

14. The motor as set forth in claim 1, wherein the coils are arranged on each of the tooth portions so as to extend from a core portion which has a substantially linear shape, and then the core portion is bent such that the core portion has a substantially circular configuration.

15. The motor as set forth in claim 1, wherein the second terminals of the second conductor plate include connecting portions to which the second ends of the wires are connected, respectively, the connecting portions are arranged radially innermost among other portions of the second conductor plate.

16. The motor as set forth in claim 15, wherein the connecting portions are arranged axially upward of the coils.

17. The motor as set forth in claim 1, wherein the insulator includes an outer wall extending in a circumferential direction at a radially outside portion within the insulator so as to cover an inner circumferential surface of the core back, a wire-inlet guide defined by a groove axially extending along the axial direction in an radially inner surface of the outer wall, a depth and a width of the groove defining the wire-inlet guide gradually increase along an axial upper direction, first end portions of the wire is positioned by arranging a portion of the wire near the first end portions thereof in the wire-inlet guide, and a corresponding second terminal and the wire-inlet guide is substantially axially aligned.

18. A motor comprising:

a stator including:
- a stator core including a plurality of magnetic steel plates laminated in an axial direction and including a core back having a substantially circular shape centered on a center axis and a plurality of tooth portions extending radially inwardly from the core back and arranged in a circumferentially spaced manner;
- a plurality of insulators covering at least a portion of the stator core so as to insulate at least the portion of the stator core; and
- a plurality of coils each of which is defined by a multi-layer structure of a wire wound around each of the tooth portions via the insulator; and a bus bar arranged axially above the stator and including a plate support;

a first conductor plate supported by the plate support and having a plurality of first terminals to which first end portions of wires extracted from the plurality of coils are to be connected; and a second conductor plate supported by the insulator and having a plurality of second terminals to which second end portions of the wires are to be connected; wherein the second end portions of the wires are connected to a neutral point via the second conductor plate, and the first terminals are arranged at positions different from positions where the second terminals are arranged in both of the axial direction and the circumferential direction.

19. The motor as set forth in claim 18, wherein radially outer tips of pins of the first terminals are arranged farther outside radially than radially inner tips of the second terminals.

20. The motor as set forth in claim 1, further comprising a resolver arranged radially inside of the bus bar and a connecting portion radially extending from the resolver, wherein the plate support of the bus bar has a substantially C-shaped configuration and includes in an axially upper surface an insertion groove which supports the first conductor plate therein and has an approximately arc shape centered on the center axis, and the connecting portion extends radially outside of the plate support of the bus bar through an opening of the substantially C-shaped configuration.

* * * * *